United States Patent [19]
Vincent

[11] 3,839,064
[45] Oct. 1, 1974

[54] INORGANIC PIGMENT-LOADED POLYMERIC MICROCAPSULAR SYSTEM
[75] Inventor: David N. Vincent, Glenview, Ill.
[73] Assignee: Champion International Corporation, New York, N.Y.
[22] Filed: Sept. 21, 1972
[21] Appl. No.: 290,807

[52] U.S. Cl............ 106/308 M, 252/316, 106/300, 106/308 Q, 106/306, 106/307
[51] Int. Cl........................ C08h 17/04, B01j 13/02
[58] Field of Search................ 106/308 M; 252/316

[56] References Cited
UNITED STATES PATENTS

| | | | |
|---|---|---|---|
| 3,405,071 | 10/1968 | Reyes.................................. | 252/316 |
| 3,516,941 | 6/1970 | Matson.............................. | 252/316 |
| 3,712,867 | 1/1973 | Schon et al. .................. | 106/308 M |
| 3,743,604 | 7/1973 | Schon et al. .................. | 106/308 M |

Primary Examiner—Delbert E. Gantz
Assistant Examiner—J. V. Howard
Attorney, Agent, or Firm—Roylance, Abrams, Berdo & Kaul

[57] ABSTRACT

Opacifying pigment particles consisting essentially of discrete, substantially spherical microcapsules each having a solid, polymeric shell and a solid, polymeric core are provided wherein discrete, inorganic pigment particles are dispersed in the polymeric core of the microcapsules. The inorganic pigment-loaded microcapsules are capable of providing a high degree of opacity and a predetermined degree of glossiness to a given substrate by varying the size of the microcapsules. In addition, the inorganic pigment-loaded microcapsules are retained by fibrous substrates to a much greater extent than are inorganic pigments per se.

20 Claims, No Drawings

INORGANIC PIGMENT-LOADED POLYMERIC MICROCAPSULAR SYSTEM

This invention relates to inorganic pigment-loaded microcapsular opacifier products and to the use of such products in the production of opacifying coating compositions and bonding compositions for fibers. More particularly, this invention relates to titanium dioxide-loaded microcapsular opacifier products having a solid core.

Various inorganic pigment particles such as titanium dioxide, barium sulfate, calcium carbonate, carbon black and the like have been conventionally utilized in papermaking and paint compositions. Inorganic pigment particles, such as titanium dioxide, have an exceptionally high opacifying effect which is derived from a high index of refraction. Such inorganic pigment particles have a very small particle size. Titanium dioxide, has a particle size of about 0.1 to 0.35 micron. Likewise, zinc oxide has an average particle diameter of 0.12 micron, barium sulfate has an average particle diameter of 0.25 micron, and calcium carbonate has an average diameter of 0.9 micron. Thus, when a filler such as titanium dioxide particles, for example, is added to cellulosic fibers in a pulp system (papermaking furnish) prior to the formulation of the fibers into the final paper web, a substantial portion of the pigment particles are not retained by the paper fibers by virtue of the nature of the particles, such as their high density, lack of bonding ability, and their relatively small size. A high pigment retention, i.e., percentage of pigment added to the pulp system which is held in the dry sheet, is desirable so as to reduce the loss of expensive pigments, such as titanium dioxide. In order to increase pigment retention, the pigment cannot be loosely held in the sheet, but must be anchored to the fiber so that it will not dust out during the calendering or printing of the paper.

It has now been found that pigment particles having excellent opacity or hiding power can be provided, which pigments can be retained to a greater degree by fibrous substrates and thereby utilized with increased efficiency, by incorporating inorganic pigment particles, such as titanium dioxide, in the solid polymeric core of microcapsules having a solid polymeric shell. Thus, the pigment particles of the present invention consist essentially of discrete, substantially spherical microcapsules, each microcapsule having a solid, polymeric shell and a solid, polymeric core, said polymeric core having discrete, inorganic pigment particles, such as titanium dioxide dispersed therein.

By loading solid, polymerized microcapsules with inorganic pigment particles, the resulting pigment may be retained by the paper fibers to a much greater extent by virtue of its new surface properties. Moreover, the inorganic pigment-loaded microcapsules may be produced having a relatively large average diameter, while at the same time being capable of providing increased opacity. Such opacifying particles may be provided with an average particle diameter in the range of, for example, 2 to 50 microns and by virtue of their having hydrogen-bondable outer walls, e.g., methyl cellulose, benzyl starch, or the like, they will be retained in the fibrous web much more efficiently than the much smaller inorganic pigment particles currently employed in the paper industry. Thus, whereas inorganic pigment retention, e.g., titanium dioxide, in papermaking is currently at about 60 to 70 percent, the efficiency or pigment retention of the utilization of the opacifying pigments of the present invention can be substantially increased. This results, of course, in a simultaneous reduction of the amount of titanium dioxide, for example, appearing as a stream pollutant in mill waste effluents.

Solid, polymeric microcapsules having a solid, polymeric shell that is at least partially grafted to a solid, polymeric core, e.g., polystyrene, are described in copending U.S. Pat. application Ser. No. 235,008, filed Mar. 15, 1972 to A. E. Vassiliades et al. This system permits the formation of a bond between a normally non-adherent polymer, such as polystyrene, and a cellulosic material, such as paper, by virtue of the grafting of the polystyrene core material of the microcapsule to the wall of the microcapsule, which wall material, e.g., methyl cellulose, is compatible with cellulosic materials. However, in order to increase the opacity of a substrate by the employment of such grafted, polymeric microcapsules, the average particle diameter of the microcapsules must be below about 2 microns and preferably below about 1 micron. As will be hereinafter demonstrated, such microcapsules provide virtually no opacity to substrates when an average particle diameter of substantially greater than 2 microns, e.g., 10 or 20 to 50 microns, is provided, as such large diameter polymeric microcapsules are substantially transparent.

The particles of the present invention can also be used as a coating on paper, plastics or other substrates. Utilized in this manner these particles not only provide a coating of high opacity and hiding power, but by varying the particle diameter of the microcapsules, the degree of glossiness of the ultimate surface may be controlled. Thus, smaller diameter pigment-loaded microcapsules provide a higher gloss surface than do larger diameter microcapsules. Thus, the inorganic pigment-loaded opacifiers of the present invention may be provided in relatively large sizes, e.g., 15 to 30 microns so as to defuse reflected light and thus reduce the degree of gloss of the ultimate substrate, while at the same time providing a highly opaque surface. Accordingly, in those instances wherein a paper substrate having a low gloss is desired, e.g., for the purposes of reducing glare of reflected light, relatively large diameter, inorganic pigment-loaded microcapsules can be utilized. Similarly, the present opacifying pigments may be incorporated in surface coatings, such as paints to provide a flat paint composition, which can form a "flat" or glare-free appearance in contrast to a glossy appearance. In this respect, the opacifying pigments of the present invention can be "tailor-made" to provide the desired combination of opacity and gloss along with the added advantage of being retained in fibrous substrates to a much greater degree than would be the inorganic pigment, per se.

Any suitable inorganic pigment particle that has been normally used as a filler for increasing opacity or providing color in papermaking or in surface coating compositions, in general, may be incorporated in the microcapsular system of the present invention. Thus, for example, suitable inorganic pigments include $TiO_2$, $CaCO_3$, $Al_2O_3 \cdot 3H_2O$, barytes ($BaSO_4$), clay, ZnO, ZnS, $CaSO_3$, $CaSiO_3$, talc, carbon black and the like. Preferred inorganic pigments for the purpose of the present invention are $TiO_2$ and carbon black.

In addition, it is preferred to employ an inorganic pigment whose surface is preferentially wet by the monomeric core material in order to ensure that the inorganic pigment particle is retained in the monomeric core during the emulsification step of the microcapsule preparation procedure. On the other hand, inorganic pigment particles having a surface that is preferentially wet by the aqueous phase of the emulsion in which the capsules are prepared, may be used by incorporating a suitable surfactant, such as, for example, the ethylene oxide adducts of fatty acids, which are adsorbed on the pigment surface making the pigment particle more oleophilic.

The pigment-loaded microcapsules of the present invention are provided by forming precursor microcapsules having a monomeric core that is capable of being polymerized in situ to form a solid polymer. During polymerization, the polymeric core containing the inorganic pigment particles may be at least partially grafted, e.g., between 20 and about 80 percent of its weight, to the solid, polymeric shell which surrounds the core. Any inorganic pigment-dispersible, monomeric material which is capable of being encapsulated in a microcapsule and polymerized therein to form a solid polymer may be employed in the present invention. Suitable monomeric materials include ethylenically unsaturated monomers, for example, acrylic esters, such as methyl acrylate, methyl methacrylate, methyl alpha-chloracrylate; vinyl esters, such as vinylacetate; vinyl ketones, such as methyl vinyl ketone; as well as other miscellaneous vinyl monomers, such as vinylidene chloride, styrene, divinyl benzene, acrylonitrile and the like; olefins such as cyclopentadiene, alone or mixtures thereof to provide the desired properties.

Preferred polymeric core materials are the thermoplastic and cross-linked thermoplastic polymers, such as polystyrene, polyvinyl chloride, polyacrylic esters or the like.

Any one of a variety of materials can be used to form the capsule walls of the microcapsules of the present invention. Thus, by practice of this invention, a single given polymerizable material, such as styrene containing titanium dioxide particles dispersed therein, may be encapsulated by any of a number of different materials, such as polyvinyl alcohol, methyl cellulose, urea-formaldehyde resin, gelatin, polyamide, and the like. After subjecting the microcapsules toi polymerization conditions, the resulting products consist of polystyrene particles, for example, surrounded by a thin skin of the chosen encapsulant material. In this manner, the surface properties of said polystyrene particles may be adjusted to be more compatible with the particular substrate to which these microcapsular particles are to be applied. For example, in the case where the polymer-pigment-containing microcapsules are to be applied to a paper substrate as an opacifying agent, the use of a highly polar and hydrogen-bondable wall material, such as urea-formaldehyde resin, results in a product that is highly adherent to the substrate. Such pigment-loaded capsules are retained by the paper substrate much more efficiently than are either the inorganic pigments, e.g., $TiO_2$, or unencapsulated polystyrene particles, respectively.

Likewise, this same monomer, i.e., styrene, which contains the titanium dioxide can be encapsulated, for example, with polyvinyl chloride providing, after subsequent polymerization, a polystyrene particle encased in a thin skin of polyvinyl chloride. Such particles could then be dispersed in a polyvinyl chloride matrix to provide a compatible composite.

Preferably, the polymeric wall of the pigment-loaded microcapsules is formed of an hydroxylated polymer, such as methyl cellulose, a substituted starch, polyvinyl alcohol, or the like, which may be cross-linked by a suitable cross-linking agent, such as a formaldehyde condensation product, e.g., melamine-, urea- or phenol-formaldehyde. A preferred wall material is polyvinyl alcohol that has been cross-linked by melamine- or urea-formaldehyde.

Although any suitable means of forming the inorganic pigment-loaded opacifying particles of the present invention may be utilized, it is preferred to incorporate the inorganic pigment into a solution of the monomer precursor of the polymeric core, e.g., styrene monomer along with a suitable polymerization catalyst for converting the monomer to a solid polymer. The monomer solution may additionally contain an oil-soluble formaldehyde condensation product for cross-linking the wall-forming emulsifying agent.

Suitable catalysts include oil-soluble catalysts, such as benzoyl peroxide, which may be incorporated in the dispersed monomer phase, or a water-soluble catalyst such as potassium persulfate, which may be incorporated in the continuous aqueous phase if desired. Alternatively, polymerization of the monomeric core precursor may be effected thermally, by the application of heat alone, or with radiation, and therefore in the absence of any catalyst, if desired.

The amount of inorganic pigment, e.g., titanium dioxide, that is dispersed in the polymerizable monomer may be varied over a wide range depending upon the desired opacity of the ultimate product. Thus, for example, between about 0.01 and 4 grams of inorganic pigment per gram of polymerizable core monomer, preferably between about 0.5 and about 2 grams per gram may be utilized.

Any suitable means of microencapsulation may be employed for the encapsulation of the pigmented monomeric core. Thus, the methods disclosed in U.S. Pat. Nos. 3,418,656 and 3,418,250 to Vassiliades may be suitably employed wherein the present inorganic pigmented, polymerizable monomer, i.e., titanium dioxide dispersed in styrene is substituted for the oily substance employed in the methods disclosed therein. The disclosures of these patents are hereby incorporated by reference.

Suitable encapsulation temperatures include, for example, between about 0° and about 100°C., preferably between about 25° and about 45°C. Of course, temperatures should not be employed which cause premature polymerization of the monomer, i.e., prior to encapsulation.

An especially preferred method of providing the monomer system-containing microcapsules of the present invention, comprises admixing:
A. a water-immiscible, polymerizable monomeric material containing dispersed, inorganic pigment particles and an oil-soluble, cross-linking agent; and
B. an aqueous solution of an hydroxyl group-containing polymeric, emulsifying agent, the admixing being conducted under conditions to form an oil-in-water emulsion, wherein the pigmented, monomeric material is dispersed in the form of microscopic droplets in an aqueous continuous phase, reacting the cross-linking agent with the polymeric emulsifying agent thereby surrounding each of the droplets with a solid, cross-linked capsule wall of the cross-linked emulsifying agent.

The reaction of the cross-linking agent in the monomeric core with the polymeric emulsifying agent, i.e., a curing step, may be conducted at any suitable temperature, for example, between about ambient temperature and about 100°C. for periods of time between about 1 and about 24 hours. The upper temperature at which the curing step may be conducted is only limited by the temperature at which the emulsion will break, i.e., the stability limit of the emulsion. Preferably, the cross-linking reaction is conducted at a temperature in the range of between about 40° and about 80°C., for a period of about 1 to 6 hours.

The ratio of polymeric emulsifying agent to cross-linking agent that is provided in the emulsion is dependent upon the particular material chosen. Suitable ratios of emulsifier to cross-linking agent include between ½ and about 100 parts by weight of emulsifying agent per part of cross-linking agent, preferably between about 2 and about 20 parts by weight of emulsifying agent per part of cross-linking agent.

In this preferred system, the capsule walls are formed solely by the reaction of the cross-linking agent with the polymeric emulsifying agent. Thus, the emulsifying agent is the sole co-reactant for the cross-linking agent.

The cross-linking agent may be an oil-soluble resin, such as the modified condensation products of formaldehyde with phenols such as, hydroxylbenzene (phenol) m-cresol and 3,5-xylenol; carbamides, such as urea; and triazines, such as melamine; amino and amido compounds, such as, aniline, p-toluenesulfonamide, ethyleneurea and guanidine; ketones, such as naphthalene; and heterocyclic compounds, such as, thiophene.

The preferred cross-linking agents are the partially-condensed melamine-formaldehyde, phenol-formaldehyde and urea-formaldehyde resins. The modified B-stage melamine and urea-formaldehyde resins are especially preferred.

Oil-soluble partially condensed resins can be prepared easily according to conventional practices. For example, the compatibility of the partially condensed resin with various oily solvents can be influenced by alkylating the resin with an alkanol, such as butanol or a combination of butanol with a higher alkanol, such as octyl alcohol or the like. The preparation of a suitable oil-soluble butylated melamine-formaldehyde resin is described on pages 460–461 of *Preparative Methods of Polymer Chemistry*, by Wayne R. Sorenson (Inter-Science Publishers, 1961) the disclosure of which is hereby incorporated by reference.

The substitution of a portion of the butanol alkylating agent by a higher alkanol increases the compatibility of the resin, e.g., melamine-formaldehyde, with the hydrocarbon solvent. The properties of such melamine resins are described on pages 192 and 193 of Amino Resins by Johm F. Blais (Reinhold Publishing Corp., N.Y., 1959).

The water-soluble, hydroxyl group-containing, polymeric emulsifier is cross-linked by the cross-linking agent dissolved in the oil phase at the oil-water interface to form a solid microcapsular shell. Suitable water-soluble polymers which may be employed in the present invention include thermoplastic resins, substituted starch, polyvinyl alcohol, methyl cellulose, the ammonium salt of styrene maleic anhydride copolymer.

Preferred water-soluble polymers are substituted starches and polyvinyl alcohol. Such substituted starches such as benzyl starch are described, for example, in U.S. Pat. No. 3,462,283 to Hjermstad, et. al., the disclosure of which is hereby incorporated by reference.

The polyvinyl alcohol especially preferred in this process are those grades known as 88 percent (nominal) hydrolyzed, high molecular weight products (e.g., commercially available as Covol 9740 from CPI or Elvanol 50–42 from DuPont). However, any of the available water-soluble grades, either fully or partially hydrolyzed, high or low molecular weight, can be utilized.

The cross-linking agent is utilized in amounts sufficient to result in the formation of microcapsules. The relative amounts vary with the particular system,, and may be easily determined in each case. However, the hydroxyl group-containing, polymeric emulsifying agent of the preferred system is dual functional, and serves not only as emulsifying agent, but preferably provides the major portion of the capsule shell.

Thus, as previously mentioned, the polymeric emulsifying agent is provided in relatively substantial amounts of, usually, at least one part by weight of emulsifier per part of cross-linking agent, with an especially preferred range of between about 2 and about 8 parts emulsifier per part by weight of the oil-soluble cross-linking agent. A suitable range of cross-linking agent based upon the oil is between about one and about 40 weight percent of cross-linking agent, preferably between about 5 and about 20 weight percent.

Emulsification may be conducted at any suitable temperature. For example, temperatures in the range of between about 20° and about 80°C., although temperatures outside of this range may also be utilized. Likewise, emulsification is conducted under conditions of agitation. As previously mentioned, the microcapsular dispersion is preferably heated to a temperature in the range of between about 40° and about 80°C. for a period of between about 1 and about 3 hours under conditions of mild agitation in order to accelerate the cross-linking reaction.

A second cross-linking agent for the polymeric emulsifying agent may be added to the microcapsular dispersion after formation of the solid, cross-linked capsule walls by the reaction between the oil-soluble cross-linking agent within the oil droplets and the emulsifying agent. The second cross-linking agent may be a non-metallic, water-soluble material, such as urea-formaldehyde, melamine-formaldehyde, an aldehyde, such as glyoxal, etc., and may be added via the aqueous, continuous phase of the dispersion. Suitable amounts of the water-soluble cross-linking agent include the same amount as the oil-soluble cross-linking agent. Exemplary amounts of the water-soluble cross-linking agent include, between about 1 and about 50 parts of emulsifier per part of water-soluble cross-linking agent.

Regardless of the manner of providing the inorganic-pigmented monomer-containing precursor microcapsules, the microcapsules are thereafter subjected to polymerization conditions in order to cause the monomer to polymerize to form an inorganic pigment-impregnated, solid, spherical polymeric core within the microcapsules. Accordingly, in order to cause polymerization of the microcapsules they may be heated, for example, to temperatures, in the range of between about 0° and about 200°C. depending upon the catalyst system employed. Thus, for benzoyl peroxide, the preferable temperature is between about 60° and about 90°C. for a period of time, for example, of between about 1 and about 24 hours preferably between about 3 and about 6 hours. For a potassium persulfate-sodium metabisulfate redox system, on the other hand, the preferred temperature is between about 20° and about 40°C. Such conditions are completely conventional in the practice of polymerization technology and would be within the skill of the art.

The temperature of polymerization may be varied over a wide range depending upon the particular monomer or monomers undergoing reaction and whether or not a catalyst is employed. However, the upper temperature limit will be that at which the structural integrity of the microcapsular wall is destroyed or rapid volatilization of the dispersing medium occurs. The temperature will be dependent on the nature of the wall material as well as of the dispersing medium. Obviously, a thermosetting capsular wall material can be utilized at higher temperatures than a thermoplastic one. The polymerization reaction may be conducted in a closed, pressurized vessel, if desired, to reduce the volatility of the ingredients.

The heating of the microcapsules in order to induce polymerization may take place at any time subsequent to their formation. Thus, for example, immediately following the microencapsulation step, the entire microcapsular dispersion may be heated to temperatures sufficient to decompose the catalyst (if one is used) and initiate polymerization. On the other hand, the pigmented monomer-containing microcapsules may first be coated onto or incorporated into the desired substrate and subsequently heated or irradiated to induce polymerization of the monomeric core. In general, the loaded-microcapsules may be heated to any temperature capable of polymerizing the encapsulated monomer. Preferably, a constant temperature is maintained on the system until the polymerization is complete or until the desired extent of polymerization is attained.

As previously mentioned, the walls of the polymer-containing capsules may be cured either by the addition of the curing catalyst, or by adjusting the temperature of the system, for example, in the range of between about 25° and 100°C., preferably between about 60° and 80°C., or by a combination of both catalyst and temperature. Alternatively, depending upon the specific system employed, the walls of the microcapsules may be cured prior to the polymerization of the monomeric core. Likewise, the microcapsules may be spray-dried either prior to or subsequent to polymerization in order to separate them from the liquid medium in which they are suspended. Spray-drying may be conducted at temperatures in the range of between 60° and 200°C., preferably between about 85° and 100°C., for example. A small amount of a polymerization inhibitor may be incorporated into the monomer prior to encapsulation to retard polymerization when employing elevated temperatures.

As previously mentioned, any suitable means of microencapsulation of the polymerizable monomeric system may be employed. Encapsulation techniques involving the phenomenon known as "coacervation" may be employed for the formation of microcapsules for use in the present invention. Accordingly, any microencapsulation method whether chemical or physical, which is capable of yielding polymerizable monomer system-containing microcapsules may be employed in the process of the present invention.

The particle size of the inorganic pigment-loaded microcapsules of the present invention may be varied over a wide range as desired. For example, the present inorganic pigment-loaded microcapsules may be provided having an average diameter of from below about 1 micron to greater than about 100 microns by adjusting variables such as the concentration of the polymeric emulsifying agent solution, the amount of shear (or vigor) utilized in agitation of the emulsion, the temperature of emulsification, etc. Thus, for example, under conditions of high shear agitation, utilizing 286 grams of a 7 percent polyvinyl alcohol solution (20 grams of dry polyvinyl alcohol), the average capsule diameter is about 1 micron. Utilizing moderate shear agitation and 500 grams of a 4 percent polyvinyl alcohol solution (20 grams of dry polyvinyl alcohol), capsules having an average diameter of about 20 to 25 microns are obtained. Preferably, the resulting inorganic pigment-loaded microcapsules have an average particle diameter greater than 1 micron, e.g., between about 2 and about 50 microns. Likewise, loaded-microcapsules having an average particle diameter between about 5 and about 40 microns are especially preferred. As previously mentioned, opacifying pigments having a reduced gloss may be provided with loaded-microcapsules of relatively larger diameter. Accordingly, microcapsules having an average particle diameter in the range of between about 10 and about 40, preferably between about 15 and about 30 microns are preferred for the reduction of gloss of coated papers and various other coatings, such as when the present loaded microcapsules are employed in paints for the purpose of providing a low gloss or flat paint.

The present inorganic pigment-loaded microcapsules have a wide variety of applications. Thus, they may be formed, for example, having an average particle diameter of below about 1.0 or 2.0 microns and may be used as conventional fillers for paper or in paint compositions where increased opacity and high gloss is desired. Thus, the present loaded microcapsules may be formed having an average particle diameter of between about 2 or 10 and about 50 microns, preferably between about 15 and about 30 microns and may be interspersed with cellulosic fibers and formed into a web of such fibers. Likewise, such low gloss-providing pigmented microcapsules may be added to a paint vehicle, i.e., a film-forming organic binder which forms an adherent, durable film when applied in a thin layer, and coated onto a substrate, such as wood or metal to provide a highly opaque, glare-free paint film. Suitable vehicles include the styrene-butadiene, polyvinyl acetate, and acrylic laticies normally used in the art.

Still further, the loaded microcapsules may be formed having an average diameter of between 1 and 100 microns and may be coated on substrates and fused in order to provide a plastic surface. Moreover, the loaded capsules may also be incorporated into the paper web and later fused, providing "spot welds" as well as opacity to the fiber system. These capsules, in the 15 to 30 micron size range, may also be used as load-bearing agents in record systems wherein image-forming microcapsules, e.g., microcapsules containing a colorless dye precursor, are employed, thus providing a more opaque and whiter coating.

Thus, a record sheet is provided which comprises a substrate, such as paper, having a coating on a surface thereof comprising pressure-rupturable, image-forming, microcapsules and pigmented, microcapsular load-bearing agents, said load-bearing agents consisting essentially of discrete, substantially spherical, non-pressure-rupturable, microcapsules having a solid, polymeric shell and a solid, preferably nontacky, polymeric core.

The pigmented, microcapsular load-bearing agents of the present invention act to prevent smudging and the like, caused by premature rupture of the image-forming microcapsules, for example, upon stacking of paper carrying the image-forming capsules and, in addition, provide a more opaque and whiter coating. For this purpose, the present load-bearing agents are provided with an average diameter which is greater than that of the image-forming microcapsules and is at least as great as the thickness of the coating that contains the image-forming capsules, so that the pigmented, load-bearing capsules will protrude through the surface of the image capsule-containing coating. The image-forming capsules normally have an average diameter in the range of between about 4 and about 25 microns, while the coating thickness is generally in the range of 10 or 15 to 30 microns.

For example, the pigmented, load-bearing microcapsules may have an average diameter which is between about 5 and about 50 microns, preferably between about 15 and about 30 microns.

The pigmented, load-bearing capsules of the present invention may be utilized in combination with any of the conventional image-forming microcapsules in a coating on a record sheet. For example, the present microcapsular load-bearing agents may be employed in a transfer sheet coating in combination with pressure-rupturable microcapsules, which have an oily core containing a colorless dye precursor of the type described in U.S. Pat. No. 3,418,656 to Vassiliades, which is hereby incorporated by reference. The load-bearing agents may be merely admixed with the coating suspension containing the image-forming microcapsules containing a suitable binder, e.g., methyl cellulose, hydroxyethyl cellulose, polyvinyl alcohol, starch, soy protein, casein, etc., and coated on the web material and dried. The production of image-forming microcapsules, dyes employed, the coating of such capsules, etc., is well-known in the art as shown in the Vassiliades patent.

The following examples illustrate the production of inorganic pigment-loaded polymeric micronecapsulation products and constitute the best modes contemplated for carrying out the present invention.

EXAMPLE 1

Twenty grams of a 50 percent solution of an oil-soluble melamine-formaldehyde condensation product and an 0.8 gram of benzoyl peroxide are dissolved in 80 grams of styrene monomer. Next, 50 grams of titanium dioxide (medium oil adsorbency grade anatase type) are dispersed in the styrene monomer solution and the resulting mixture is emulsified in 400 grams of a 5 percent aqueous solution of polyvinyl alcohol (20 grams dry weight of a nominally 88 percent hydrolysis, 40 centipoises grade product) using moderate agitation.

The resulting emulsion is then heated at a temperature of 77° to 80°C. for a period of 6.5 hours to first cure the capsule walls and secondly, polymerize the styrene monomer. The resulting particles have an average particle diameter of 15 microns.

The resulting product is an aqueous dispersion of microcapsules containing, as a core, solid polystyrene in which the titanium dioxide pigment is dispersed.

EXAMPLES 2–5

For comparative purposes, the opacity of a control sample of grafted microcapsules is compared with that of the same microcapsules containing varying amounts of inorganic pigment. Procedure of Example 1 is repeated with the exception that the titanium dioxide is omitted, and the resulting microcapsules have an average diameter of between about 10 and about 20 microns. The capsules are coated onto paper by using conventional Bird applicators to obtain several different coating weights. The opacity of the dried coated sheets is measured and the scatter coefficient is calculated by means of the Kabulka-Munk equations.

Next, the procedure of Example 1 is repeated with the exception that 20 and 100 grams of titanium dioxide, respectively, are employed in separate runs in addition to the 50 gram run as employed in Example 1. Each of the samples of microcapsules are coated on paper and the scatter coefficient is measured. The results are set forth in Table I below:

TABLE I

| Example No. | Concentration of Anatase Titanium Dioxide (grams) | Scatter Coefficient (gram$^{-1}$) |
| --- | --- | --- |
| 2 | 0 | nil |
| 3 | 20 | 700 |
| 4 | 50 | 1000 |
| 5 | 100 | 2420 |

The results of the foregoing examples clearly illustrate the non-loaded microcapsules have virtually no opacity, i.e., they are essentially transparent, whereas the titanium dioxide-loaded microcapsules are capable of providing opaque coatings which increase with the amount of the titanium dioxide incorporated.

EXAMPLE 6

The procedure of Example 1 is followed with the exception that 267 grams of a 15 percent aqueous solution of benzylated starch is used instead of polyvinyl alcohol and a medium oil adsorbency grade rutile-type $TiO_2$ is employed rather than the $TiO_2$ of Example 1.

EXAMPLE 7

Ten grams of polyvinyl chloride, 100 grams of styrene monomer and one gram of benzoyl peroxide are dissolved in 100 grams of tetrahydrofuran. Next, 50 grams of titanium dioxide are dispersed in this solution and the resulting mixture is added slowly to 400 grams of a 5 percent aqueous solution of methyl cellulose which is under vigorous agitation in a Waring blender. After completion of the addition, moderate agitation is continued for 15 minutes.

The resulting emulsion is then heated at 80°C. for 5 hours to polymerize the styrene monomer and thus provide pigmented microcapsules having a solid core.

Although the invention has been desribed in considerable detail with particular reference to certain preferred embodiments thereof, variations and modifications may be effected within the spirit and scope of the invention as described hereinabove and as defined in the appended claims.

What is claimed is:

1. Opacifying pigment particles consisting essentially of discrete, substantially spherical microcapsules each said microcapsule having a solid, polymeric shell surrounding a solid, organic, polymeric core, said polymeric core having discrete, inorganic pigment particles dispersed therein, said polymeric shell and said polymeric core being formed of different polymeric materials.

2. The opacifying pigments of claim 1 wherein said pigments have an average particle diameter of between about 1 and about 100 microns.

3. The opacifying pigments of claim 1 wherein said pigment particles have an average particle diameter between about 10 and about 30 microns.

4. The opacifying pigment particles of claim 1 wherein said polymeric shell material is an hydroxylated polymer.

5. The opacifying pigment particles of claim 4 wherein said polymer is benzyl starch, methyl cellulose or polyvinyl alcohol.

6. The opacifying pigments of claim 5 wherein said hydroxylated polymer is polyvinyl alcohol.

7. The opacifying pigment particles of claim 6 wherein said core is polystyrene.

8. The opacifying pigment particles of claim 1 wherein said inorganic pigment is a member selected from the group consisting of titanium dioxide, barium sulfate, calcium carbonate and carbon black.

9. The opacifying pigments of claim 8 wherein said inorganic pigment particles are titanium dioxide.

10. The opacifying pigments of claim 6 wherein the polyvinyl alcohol is cross-linked by either urea-formaldehyde or melamine-formaldehyde.

11. The opacifying pigment particles of claim 1 wherein said solid polymeric core is at least partially grafted to said solid polymeric shell.

12. The particles of claim 11 wherein said grafting is between 20 and about 80 percent by weight.

13. A coating composition for improving the opacity of a surface, said coating composition comprising opacifying pigment particles consisting essentially of discrete, substantially spherical microcapsules, said microcapsules having a solid, polymeric shell surrounding a solid, inorganic, polymeric core, said polymeric core having discrete, inorganic pigment particles dispersed therein, said polymeric shell and said polymeric core being formed of different polymeric materials.

14. The coating composition of claim 13 wherein said pigmented microcapsules have an average diameter between about 15 and about 40 microns and said composition additionally comprises a paint vehicle.

15. The coating composition of claim 14 wherein said inorganic pigment is titanium dioxide.

16. The coating composition of claim 15 wherein said shell is an hydroxylated polymer and said core is polystyrene.

17. The coating composition of claim 14 wherein said microcapsules constitute between about 5 and about 60 percent by volume of said composition.

18. The coating composition of claim 14 wherein said paint vehicle is styrene-butadiene or polyvinyl acetate.

19. A coating composition for improving the opacity of the surface, said coating composition comprising opacifying pigment particles consisting essentially of discrete, substantially spherical microcapsules, said microcapsules having a solid, polymeric shell and a solid, organic, substantially spherical, polymeric core, said polymeric core being formed of polystyrene and being between about 20 and about 80 percent by weight grafted to said polymeric shell which surrounds said core, said polymeric core having discrete, inorganic pigment particles dispersed therein, said coating composition additionally containing a paint vehicle, said microcapsules constituting between about 5 and about 60 percent by volume of said composition.

20. The coating composition of claim 14 wherein said polymeric core is a non-tacky polymer.

* * * * *